United States Patent [19]

Rademacher

[11] Patent Number: 4,473,616

[45] Date of Patent: Sep. 25, 1984

[54] MOLDED ARTICLES COMPRISING FIBER REINFORCED STYRENE POLYMERS

[75] Inventor: Leo E. Rademacher, Springfield, Mass.

[73] Assignee: Monsanto Company, St. Louis, Mo.

[21] Appl. No.: 563,901

[22] Filed: Dec. 21, 1983

[51] Int. Cl.³ .............................................. B32B 27/00
[52] U.S. Cl. .................................... 428/251; 264/240; 264/324; 428/268; 428/273; 428/285; 428/288; 428/290
[58] Field of Search .............. 428/251, 268, 273, 285, 428/288, 290; 264/240, 324

[56] References Cited

U.S. PATENT DOCUMENTS 3,022,210  2/1962  Phillips ................................ 156/180
3,635,879  11/1969  Baer et al. ...................... 260/41 AG

OTHER PUBLICATIONS

Encyclopedia of Polymer Science and Technology, Wiley, 1970, vol. 12, pp. 32, 33, 36.

*Primary Examiner*—Marion E. McCamish
*Attorney, Agent, or Firm*—R. Bruce Blance; William J. Farrington; Paul D. Matukaitis

[57] ABSTRACT

Molded articles comprising glass fiber reinforced styrene polymer wherein the weight ratio of glass fiber to styrene polymer is in the range of about 55:45 to about 75:25. The molded articles are prepared by a transfer molding process in which glass fiber mat containing 1 to 5 weight percent of an unsaturated polyester binder is impregnated with styrene monomer and the mold is subjected to conditions which induce fast polymerization of the styrene monomer. The molded articles possess resistance to heat distortion.

3 Claims, No Drawings

MOLDED ARTICLES COMPRISING FIBER REINFORCED STYRENE POLYMERS

BACKGROUND OF THE INVENTION

This invention relates to molded articles comprising fiber reinforced styrene polymers which are resistant to heat distortion, and to a method of manufacturing such articles. More particularly the invention is directed to molded articles comprising styrene polymers reinforced with a high concentration of glass fiber, and to a method of manufacturing such articles by a transfer molding process.

Molded articles comprising styrene polymers reinforced with moderate amounts of glass fiber to provide a modest increase in the heat distortion temperature have been prepared by injection molding methods. Unsaturated polyesters and solutions of unsaturated polyesters in styrene monomer have been applied to glass reinforcement to provide molded articles which are hard, and have flexural strength and heat distortion resistance. However such unsaturated polyester systems are high in viscosity and must be applied at high pressure and temperature to provide void free moldings. Moreover the molded articles obtained from them tend to be brittle and to require a post-curing step to complete the cure of the unsaturated groups.

I have now found that molded articles comprising styrene homopolymer or styrene acrylonitrile copolymer reinforced with at least about 55 weight percent of a reinforcing fiber, prepared by a monomer transfer molding process, possess toughness and resistance to heat distortion and do not require a post-curing step.

The molded articles comprise a fiber-reinforced styrene polymer wherein the weight ratio of the fiber reinforcement to the styrene polymer is in the range of 55:45 to 75:25, wherein the fiber reinforcement is a mat or weave of long glass fibers. The molded articles generally have a heat distortion temperature determined under a load of 264 psi (1819 kPa) above about 200° C.

The styrene polymer is a homopolymer or a copolymer of styrene and acrylonitrile comprising up to 50 weight percent acrylonitrile. The styrene polymer is advantageously prepared by fitting a weave or mat of long fibers of glass, into the cavity of a transfer mold, closing and clamping the mold, filling the free space in the mold with the monomer or monomer mixture containing a free radical initiator, heating the mold to a temperature which allows polymerization of the monomers initiated by the free radical initiator to proceed to about a 98 percent conversion and opening the mold and removing the molded article. The time required for polymerization is generally less than about 30 minutes.

The fiber-reinforcement of the molded article is a weave or mat of fibers of at least about 25 mm in length and of diameter in the range of about 5 to about 25 microns. The glass fiber mat is formed from chopped strands of fiber which have been treated with a coupling agent such as vinyltriethoxysilane, vinyltrimethoxysilane, methacrylotrimethoxysilane, or methacrylochromium chloride. The mat is sized with from about 1 to about 5 weight percent of a binder comprising an unsaturated polyester of molecular weight in the range of about 1000 to about 10000, prepared by condensation of a mixture of saturated and unsaturated dicarboxylic acids and glycols of the type conventionally used in the manufacture of such unsaturated polyesters, the unsaturated acids being maleic and fumaric acids present in a concentration of about 10 to about 100 mole percent of the total dicarboxylic acid. Suitable glycols include ethylene glycol, propylene glycol, diethylene glycol, polyethylene glycols, polypropylene glycols and poly(-tetramethylene glycols) of molecular up to 400, 1,6-hexanediol, and 1,4-dimethylol cyclohexane. Suitable dicarboxylic acids include phthalic acid, isophthalic acid, terephthalic acid, succinic acid, adipic acid and azelaic acid. Preferably the unsaturated polyester has a melting point in the range of about 50° to about 150° C.

The mold used in the transfer molding process need not be designed for high pressure as is required for injection molding. The molds are advantageously made of low priced metals or fiber reinforced thermoset resins backed by metal supports of designs suitable for withstanding 350–2100 kPa pressure. The mixture of monomers is introduced into the mold by pumping or other suitable means.

To provide a polymerization time less than about 30 minutes, the particular initiator or combination of initiators, and the amount thereof will vary depending on the monomer(s) used. For styrene, for example, a commonly used initiator is tert.-butyl perbenzoate advantageously in the amount of about 0.8 to about 1.0 mole percent. For mixtures of styrene and acrylonitrile it can be advantageous to use a combination of two or more peroxides whose decomposition temperatures differ by 20° C. or more, for example, 0.4 mole percent each of lauroyl and benzoyl peroxides and tert-butyl perbenzoate. The choice of initiator(s) should be made on the basis of reaction temperature used, the volatility of the monomers and the decomposition temperature of the initiator.

The concentration of free radical initiator(s) is advantageously in the range from about 0.4 to about 1.5 mole % of the monomer composition. The preferred temperatures of reaction are about 90°–110° C. for styrene acrylonitrile monomer mixtures. This range is preferred because of the high vapor pressure of acrylonitrile. When styrene is used alone, temperatures of about 90°–150° C. are preferred.

Other elements which may be present in the compositions and are conveniently added in the monomer mixture are promoters such as conventional metal driers for example cobalt naphthenate to increase the rate of polymerization. Fillers such as clay, talc, glass spheres, mica, etc. may be added as partial replacement for the fiber reinforcement provided that the total fiber and filler content is maintained in the weight range of about 25 to about 45 percent and and provided further that no more than 20 weight percent of fiber reinforcement is replaced with filler. Stabilizers, release agents, such as wax and pigments, etc. may also be added. The materials and process are useful for making highly glass loaded, economical composites with high heat resistance and excellent stiffness and strength.

The following examples are set forth to illustrate the invention but are not intended to limit its scope. Units and percentages are by weight unless stated otherwise.

EXAMPLE 1

Several layers of unwoven glass mat of 51 g weight per sq. meter, comprising chopped strand fibers of 50 mm in length, bound with 3 weight percent of an unsaturated maleate polyester, are fitted into a cavity 3.2 mm deep of a mold comprising two Teflon coated plates and a shim creating the cavity, and having a charging port fitted with a small reservoir for excess monomer and a vent. The amount of glass is chosen to result in a composite consisting of 60% glass and 40% polymer matrix. The mold is then bolted shut and a vacuum is pulled on the cavity (about 5 Torr).

A mixture of styrene, 76 parts, acrylonitrile, 24 parts, and 0.4 mol. % each of lauroyl and benzoyl peroxides and t-butyl perbenzoate is sucked into the mold and the reservoir at room temperature.

The vent is sealed and the reservoir is pressurized to 550 kPa with nitrogen so as to force more of the monomer mixture into the mold to compensate for shrinkage during the polymerization. The mold is placed in a constant temperature bath at 100° C. for 30 minutes. It is then removed from the bath and cooled to room temperature.

The molded piece is removed from the mold and tested for various properties set forth in Table I.

Results shown in the Table indicate that the polyester is too viscous to be used with more than about 40% glass.

I claim:

1. A molded article comprising a glass fiber-reinforced styrene homopolymer or styrene acrylonitrile copolymers consisting of up to 50 weight percent of acrylonitrile, wherein the weight ratio of the glass fiber reinforcement to the styrene polymer is in the range of about 55:45 to about 75:25, and wherein the fiber reinforcement is a mat or weave of long glass fibers of at least about 25 mm in length and of diameter in the range of about 5 to about 25 microns containing from about 1 to about 5 weight percent of an unsaturated polyester binder of molecular weight in the range of about 1000 to about 10000.

2. The molded article of claim 1 wherein the heat distortion temperature determined under a load of 264 psi (1819 kPa) is above 200° C.

TABLE I

PROPERTIES OF MOLDINGS

| Ex. No. | Matrix Parts by wt. Styrene | AN | Initiator Type | Mol % | Glass Weight % | Polymerization Temp | Time Min. | DTUL, C.° 1.82 MPa | Flexural Modulus, MPa | Flexural Strength MPa |
|---|---|---|---|---|---|---|---|---|---|---|
| 1 | 76 | 24 | L + B + T | 0.4 Ea | 60 | 100 | 30 | >230 | 12,420 | 290 |
| 2 | 76 | 24 | L + B + T | 0.4 Ea | 53 | 100 | 30 | 126 | 10,350 | 242 |
| 3 | 76 | 24 | L + B + T | 0.4 Ea | 68 | 100 | 30 | >230 | — | — |
| 4 | 100 | 0 | T | 0.8 | 60 | 140 | 20 | >230 | 11,730 | 401 |
| 5 | Commercial[1] Polyester | | MEKO$_2$ | — | 60 | 100 | 30 | >230 | 13,800 | 174 |
| 6 | Commercial[2] Polyester | | MEKO$_2$ | — | 40 | 25 | 16 hr. (includes post cure) | >200 | 3,970 | 110 |

Note
[1] Resin does not fill mold completely because of high viscosity.
[2] Highest glass loading permitting mold filling.
Code:
AN = acrylonitrile
Initiators L = lauroyl peroxide, B = benzoyl peroxide, T = t-butyl perbenzoate, MEKO$_2$ = methyl ethyl ketone peroxide

EXAMPLE 2

The process of Example 1 is repeated with the exception that 53 weight percent of glass fiber mat is used. Results are shown in the Table.

EXAMPLE 3

The process of Example 1 is repeated with the exception that 68% glass fiber mat is used. Results are shown in the Table.

EXAMPLE 4

The process of Example 1 is repeated to provide glass reinforced polystyrene by adding 40 parts of styrene containing 0.8 mole % t-butyl perbenzoate to 60 parts of glass fiber mat.

The mold is placed in a 140° C. bath for 20 minutes to effect polymerization. The properties of the glass reinforced polystyrene are given in the Table.

EXAMPLES 5 AND 6

A commercial unsaturated polyester sold by Ashland Oil Co. under the tradename Aropol 7241 RT is used to provide the polymeric matrix in a glass reinforced transfer molded part prepared by the process of Example 1.

3. A process of preparing a molded article of a glass fiber reinforced styrene polymer of heat distortion temperature above 200° C. determined under a load of 264 psi (1819 kPa), wherein the weight ratio of the glass fiber reinforcement to the styrene polymer is in the range of about 55:45 to about 75:25, said process comprising:

A. fitting a weave or mat of glass fibers of length at least about 25 mm and a diameter in the range of about 5 to about 25 microns containing from about 1 to about 5 weight percent of an unsaturated polyester binder of molecular weight in the range of about 1000 to about 10000 into the cavity of a transfer mold;

B. closing and clamping the mold;

C. filling the free space in the mold with styrene or a styrene acrylonitrile solution containing up to 50 weight percent acrylonitrile, said styrene or styrene acrylonitrile solution containing a free radical initiator;

D. heating the mold to a temperature which allows polymerization of the monomers initiated by the free radical initiator to proceed to about a 98 percent conversion; and E. opening the mold and removing the molded article.

* * * * *